United States Patent [19]

Fleming et al.

[11] 4,396,989

[45] Aug. 2, 1983

[54] METHOD AND APPARATUS FOR PROVIDING A VIDEO DISPLAY OF CONCATENATED LINES AND FILLED POLYGONS

[75] Inventors: James R. Fleming, Indianapolis, Ind.; William A. Frezza, North Brunswick; Gerald S. Soloway, Holmdel, both of N.J.

[73] Assignee: Bell Telephone Laboratories, Incorporated, Murray Hill, N.J.

[21] Appl. No.: 265,346

[22] Filed: May 19, 1981

[51] Int. Cl.[3] .............................................. G06F 3/153

[52] U.S. Cl. .................................... 364/521; 340/739; 364/719

[58] Field of Search ............... 364/520, 521, 718, 719; 340/730, 739, 750, 799

[56] References Cited

U.S. PATENT DOCUMENTS

| | | | |
|---|---|---|---|
| 3,952,297 | 4/1976 | Stauffer et al. | 364/521 X |
| 4,027,148 | 5/1977 | Rosenthal | 364/719 |
| 4,056,713 | 11/1977 | Quinn | 364/521 |
| 4,115,863 | 9/1978 | Brown | 364/719 X |
| 4,272,808 | 6/1981 | Hartwig | 364/718 |

OTHER PUBLICATIONS

P. Baudelaire et al., "Techniques for Interactive Raster Graphics", *Computer Graphics*, Quarterly Report of Siggraph-ACM, 7-1980, pp. 314-320.

Tektronix, Inc.'s 4027 Color Graphics Terminal Operator's Manual, Sep., 1978, pp. 6-7 and 6-8.

Principles of Interactive Computer Graphics, Second Edition, 1979, McGraw-Hill, Inc., pp. 20-28 and 232-239, William M. Newman and Robert F. Sproull.

Communications Research Centre, Dept. of Communications, Canada, Picture Description Instructions (PDI) for the Telidon Videotex System-CRC Technical Note No. 699-E, pp. 27-28, 34-35, H. G. Bown, C. D. O'-Brien, W. Sawchuk and J. R. Storey.

*Primary Examiner*—Jerry Smith
*Attorney, Agent, or Firm*—S. R. Williamson

[57] ABSTRACT

A method and apparatus for compactly describing an image made up of concatenated lines or filled polygons. The drawing of lines for the image begins at an initial drawing point determined in a coordinate system defined by a unit screen and proceeds from point to point with the relative coordinates of each successive point specified as a positive or negative step in the horizontal and/or the vertical direction from the previous point. The step size parameters which separately define both the amount of a change in the horizontal direction and the amount of a change in the vertical direction are initially specified in fractional parts of the unit screen and remain constant in magnitude throughout the operation. The image is reflected about the horizontal axis and about the vertical axis simply by changing the sign of the step sizes. Turning on and off the drawing process is also facilitated.

10 Claims, 4 Drawing Figures

METHOD AND APPARATUS FOR PROVIDING A VIDEO DISPLAY OF CONCATENATED LINES AND FILLED POLYGONS

BACKGROUND OF THE INVENTION

1. Technical Field

This invention relates to video display systems and, more particularly, to a method and apparatus for providing concatenated lines and filled polygons in a video display.

2. Description of the Prior Art

Various display systems have been proposed and used heretofore employing interactive computer systems wherein the user manipulates the information stored in or generated by a computer. This information may constitute text, graphics, facsimile, video and the like. In the recent past the advent of very large scale integrated circuitry has made possible the wide use of low cost microcomputer systems. With such a system it is now cost effective to maintain central data bases from which information can be accessed by the general public.

Two information systems using central databases, viewdata and teletext, are currently being considered for wide use in the telecommunications industry. In the viewdata system, the consumer is provided a two-way interactive service capable of displaying pages of text and pictorial materials on a video display. In the teletext system, the consumer is provided with a one-way broadcast information service for displaying pages of text and graphic material on a video display.

In both the viewdata and teletext systems it is necessary to include an electronics module at the consumer end that provides the display control information. In the present invention this module provides the necessary control to the consumer display terminal (such as an ordinary television set) for assembling and displaying an image made up of concatenated lines and filled polygons.

One scheme for providing the control for this type of display is implemented by using a chain link encoding technique wherein the chain link code gives the starting coordinates of a point on an image and then sequences through the coordinates of each subsequent point in defining the lines or border of a polygon. In a rectilinear display array there are eight possible directions that a display point can move to an adjoining point in defining a line or border of a polygon. And three bits of data are generally used to indicate the location of the coordinates for the next point. In an effort to minimize the number of bits in defining the direction of the display point, some arrangements are designed to use two bits rather than three. These arrangements still require the third bit or additional data, however, to provide information as to whether the line defined by the display point as it moves from one set of coordinates to another is written or not written onto the screen. While such arrangements have been found satisfactory where there is both ample bandwidth for transmitting and memory available for storing the data, in those systems where cost is a consideration it is desirable to minimize the total amount of data requirements required to describe an image.

SUMMARY OF THE INVENTION

In accordance with the current invention, an electronics module describes in a compact manner a graphic image made up of filled polygons of concatenated lines and allows for the concatenated lines to be interspersed with gaps by turning the writing means on and off as required. The module also provides a coding arrangement that allows for easy reflections of the image. In applicant' inventive arrangement the line drawing begins at an initial drawing point determined within a coordinate system defined by a unit screen and proceeds from point to point with the relative coordinates of each successive point specified as a positive or negative step in a horizontal or X-direction and/or a vertical or Y-direction from the previous point. The step size parameters which separately define the amount of the change in the X-direction and the change in the Y-direction are specified at the beginning of the operation in a single operand of predetermined length and remain constant in magnitude throughout the operation. The sequence of step directions which make up the image are encoded in a second operand whose length depends only on the amount of data transmitted.

The advantages of the foregoing arrangement and other advantages of the invention will be more fully understood from the following description of an illustrative embodiment taken in conjunction with the accompanying drawing.

DETAILED DESCRIPTION

Figure 1:
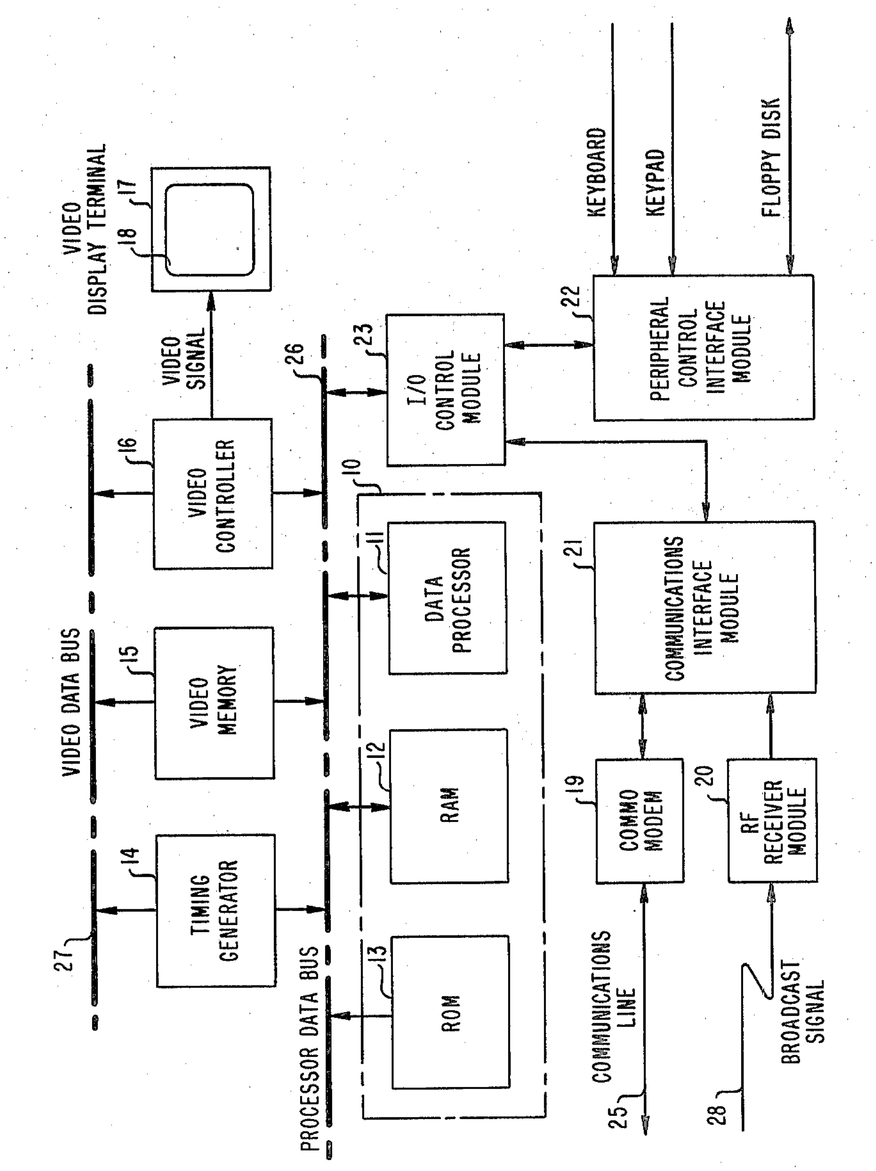
FIG. 1 is a block diagram of an image display system according to the present invention.

Referring now to FIG. 1 of the drawing, there is shown a general block diagram of an image display system comprising an electronics module and employing the principles of the present invention. The elements employed in the image display system are computer 10, timing generator 14, video memory 15, video controller 16, video display terminal 17 with a display screen 18, communications modem 19, RF receiver module 20 and control interface modules 21, 22, and 23.

The videotex input to the system is provided over a two-way communications line 25 to the communications modem 19. Commands from the computer 10 are sent to a remote computer (not shown) over the communication line 25 and the request information is similarly returned over this line to the communications modem 19. The teletext input to the system is provided via the RF receiver module 20. This module provides a one-way communications medium for the system for receiving a broadcast signal 28 from a remote data bank. The viewdata and teletext information are both coupled to the communications interface 21 for inputting to the computer 10. The peripheral control module 22 couples user input such as that obtained from a keyboard, keypad, floppy disk or other peripheral data input device to the computer 10 in accordance with the service desired. The peripheral control module 22 is bidirectional in that data is also coupled from the computer 10 to a peripheral memory attached thereto. Input/output controller module 23 is under the control of the system user and provides selectable access to the viewdata and teletext signals from communications interface module 21 as well as to user provided inputs from the peripheral control interface module 22. The control module 23 provides a data link between these modules and the processer data bus 26 which connects to the computer 10.

Contained in the computer 10 are a data processor 11, random access memory 12 and read only memory 13. This processor responds to data inputted into input/output control module 23. And with input from random access memory 12 and read only memory 13, processor 11 also provides the processed digital data to the processor bus 26 for loading the video memory 15 and for responding in one of the two-way communications arrangements.

Connected to the video memory 15 via a video data bus 27 is the video controller 16. This controller accepts digital image information from the video memory 15 and provides it in a form suitable for displaying on the display screen 18 of video display terminal 17. The timing for the elements supplying signals to the video data bus and the processor data bus are provided by timing generator 14.

The image display system of FIG. 1 is usually remotely located with respect to the central data bases from which it accesses information. The system is arranged to receive the encoded information from the data base in the form of picture description instructions (PDIs). These are a compact set of commands for picture drawing or control. Each command consists of an opcode followed by one or more operands (bytes of data). The coding system using PDIs have essentially three modes of operation. They are: alphanumeric which includes characters and numbers, geometric which includes primitives of point, line, arc, rectangle and polygon, and finally photographic which is facsimile-like operation describing an image in a point by point encoded manner.

Figure 2:
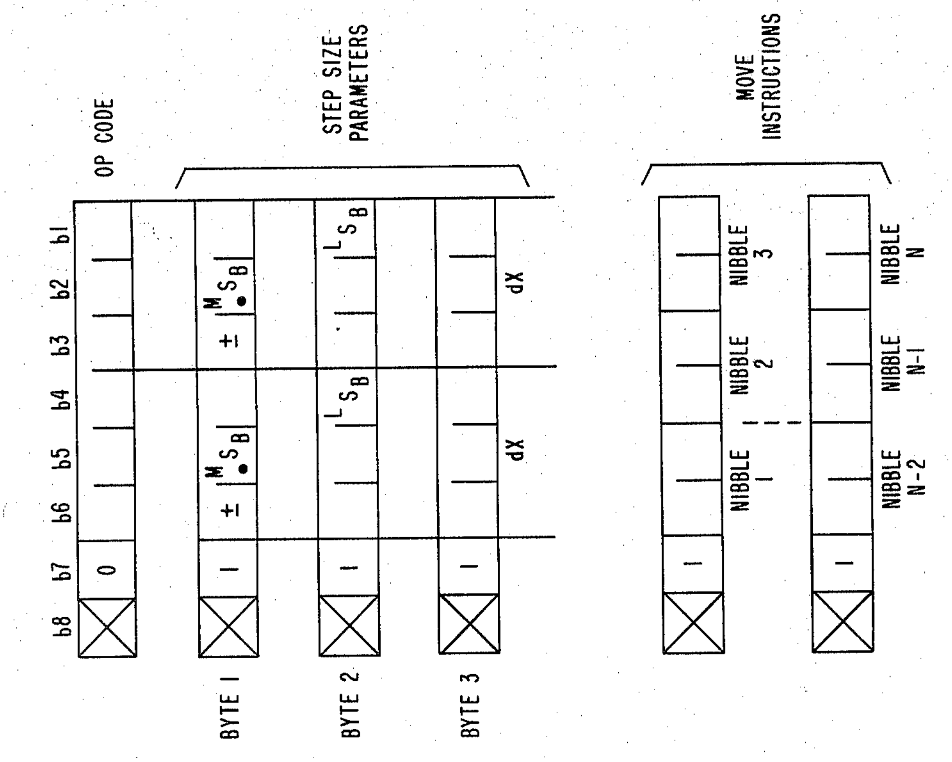
FIG. 2 is an illustration of a picture description instructions coding structure used in the present invention.

Referring to FIG. 2, there is shown an example of a PDI code in accordance with the international standard CCITT-S.100 "International Information Exchange for Interactive Videotex," Yellow Book, Volume VII.2, Geneva, 1980 techniques. The PDI code consists of an 8-bit data byte. Bits are numbered B1 to B8 with B8 occupying the most significant position. The bit B8 is either used for code extension or used to describe parity, while the other 7 bits are used as an index to a character code table. There are, therefore, 7 bits of data in each byte. The format for PDI drawing commands is a 6-bit data field and a 1-bit flag field. The flag field or bit 7 is used to indicate whether the byte represents a command opcode or data set forth in operands that follow the opcode. The opcode is a 1-byte data character that initiates the execution of a locally stored geometric primitive or control operation and always has a 0 for its flag field. The operands follow the opcode and can be a single or multiple byte string from the numeric data field of the PDI code. The operand is thus identified with a particular opcode, and action taken on the data contained therein is interpreted in accordance with that opcode. The flag field is always a 1 for each operand.

The image display system utilizes the basic format for PDI codes and the unit screen coordinate system as is described in a document entitled "Picture Description Instruction PDI for the Telidon Videotext System," by H. G. Brown, C. D. O'Brien, W. Sawchuk and J. R. Story, dated November, 1979 and originated by Department of Communications/Communications Research Centre as Document No. CRC Technical Note No. 699-E. The unit screen is defined as a coordinate space whose dimension runs from 0 to 1 in the horizontal or X direction and from 0 to 1 in the vertical or Y direction. This coordinate space is mapped to the physical display of screen 18 with the origin or (0, 0) point being in the lower left corner of the display and the (1, 1) point being in the upper right corner of the display. All coordinate specifications are given, therefore, as fractional distances in the unit screen. For example, the point ($\frac{1}{2}$, $\frac{1}{2}$) would be in the center of the display.

The image display system of FIG. 1 is arranged to receive from a data base images made up of concatenated incremental lines and filled polygons described in a highly compact manner. The line drawing begins at an initial drawing point specified in the coordinate system defined by the unit screen and proceeds from one line end point to another of multiple line end points with the relative coordinates of each successive end point being specified as a positive or negative step in a horizontal or X-direction and/or a vertical or Y-direction from the previous point. The step size parameters which separately define the amount of the change in the X-direction and the change in the Y-direction are specified at the beginning of the operation in a single operand and remain constant in magnitude throughout the operation.

The incremental line command takes two operands. The first operand specifies the step size parameters which are signed quantities (dx, dy,) that represent a step size applied to the drawing operation. These bytes (a total of 18 useful bits) are used to create the step size parameters dX and dY. It should be noted that the number of bytes can be increased or decreased depending on the desired resolution in the step sizes. The horizontal step size (dX) is taken as the concatenation of the first three bits (b6–b4) taken from each of the three bytes (byte 1–byte 3). The first bit (b6 of byte 1) is taken as a sign bit, 0 for positive and 1 for negative. The remaining bits are interpreted as a binary fraction with b5 of byte 1 being the Most Significant Bit (MSB) and b4 of byte 3 being the Least Significant Bit (LSB). The MSB, therefore, represents the halve's place, the next bit (b4 of byte 1) representing the quarter's place, and so on until the LSB which represents the 1/256th's place. This binary function specifies the horizontal step size (dX) as a fraction of the total horizontal dimension of the active display area onto which is mapped the unit screen. By way of example, if dX were +0.00000011, the horizontal step size (dX) of the operation would be 3/256ths of the horizontal dimension of the active display area of the unit screen. The vertical step size (dY) is interpreted in a similar manner and taken from the last three bits (b3–b1) of each of the three bytes (byte 1–byte 3). In this case, the vertical dimension of the active display area, onto which the unit screen is mapped, is taken as a reference.

The second operand in the incremental line command is an operand which consists of an indeterminate number of bytes, each of which contains three 2-bit nibbles in the numeric data field (b6–b1). The sequence of these 2-bit nibbles specifies the move instructions for the operation selected as described in the table below and more fully explained herein with reference to the flow diagram of FIG. 3.

| Nibble | Primary Instruction |
|---|---|
| 0 0 | ESCAPE |
| 0 1 | take a step in X of DX |
| 1 0 | take a step in Y of DY |
| 1 1 | take a step in X of dX and Y of dY |

As seen in the table above, if the 2 bits are (0, 0), then an escape is indicated. In this case, no drawing action is taken and the next nibble is accessed and interpreted in accordance with the following table to determine what parameter changes should be made. The escape instruction is also more fully explained with reference to the flow diagram of FIG. 3.

| Nibble | ESCAPE Instruction |
|---|---|
| 0 0 | draw on/off |
| 0 1 | negate dX |
| 1 0 | negate dY |
| 1 1 | negate dX and dY |

The incremental polygon (filled) command takes two operands and is similar to the incremental line command except that the polygon command produces a polygon filled in the in use color(s) and texture of the display system. The first operand indicates the step size and is interpreted the same as the step size parameter in the incremental line PDI code. The second operand contains the move instructions which are also interpreted in a very similar manner to the move instructions in the incremental line PDI code. The set of points defined by these operands specify the vertices of the polygon to be drawn, and the final drawing point is implicitly taken as the initial drawing point. The incremental polygon fill command and its operation are more fully explained and literally understood when reference is made to the flow diagrams of FIGS. 3 and 4.

It is to be noted that if the sign(s) of the step size parameters dX and/or dY in either the incremental line command or the incremental polygon (filled) command are changed with the data describing the move instructions in the second operand left the same, the resulting image will be reflected about the corresponding axis. Also, if the magnitudes of dX and/or dY are changed with the data in the second operand left the same, the resultant image will be scaled in the horizontal and/or vertical dimensions.

Figure 3:
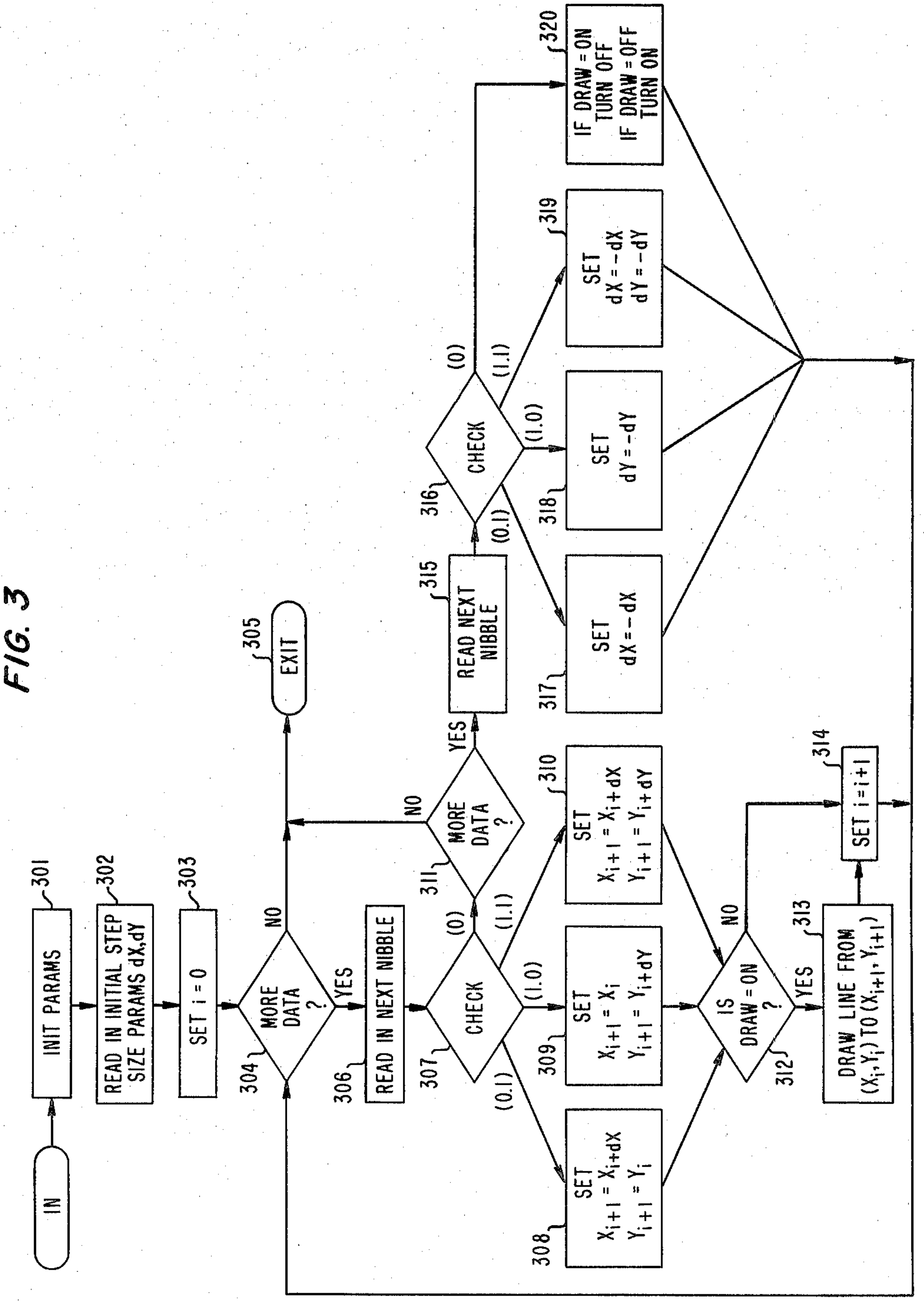
FIG. 3 depicts a flowchart disclosing the method of describing an image made up of concatenated lines in accordance with this invention.

FIG. 3 is a flowchart illustrating the operation of the video image display system in executing the incremental line operation. The functions provided by data processor 11 are advantageously determined by a process or program stored in read only memory 13. The process is entered at 301 where the initializing parameters are set. These include setting the draw line operation on, providing the initial coordinates of X and Y, also setting the line color, line thickness and line texture. The next step is to read in the step sizes of changes in X or dX and changes in Y or dY. After the step size is read into the process at 302, the integer value i is set at 0 in 303 reflecting that the line drawing begins at this initial drawing point.

The process advances to the decision 304 to check for more data. If there is no more data available in the move instruction operand, the program is exited at exit 305. If there is data present then the process reads the next 2 bit nibble at 306. With this 2 bit nibble, a branch instruction with four possible results is executed at decision 307. It is at this location that the primary instructions are executed. If the primary instruction is 0 and 1 (the first number referred to being the Y bit and the second number referred to being the X bit here and throughout the remainder of this specification), then the process proceeds to 308 where a step is taken in X and Y remains unchanged. If the primary instruction is 1 and 0 then the process proceeds to 309 where a step is taken in Y and X remains unchanged. If the primary instruction is 1 and 1, then the process proceeds to 310 where a step is taken in both X and Y. Finally if the primary instruction is 0 and 0 then an escape is indicated and the process proceeds to 311.

If the nibble in the primary instruction is such that X or Y, or X and Y are incremented, then the process moves to the decision 312 where a check is made to determine whether the draw parameter is on or off. If the draw parameter is on, the process proceeds to 313 and a line is drawn from the old point to the new point displaced in an X direction or Y direction or both X and Y directions as previously defined. But if the draw parameter is off then the process advances to 314 and the X or Y, or X and Y points are incremented just the same without drawing a line from the old to the new point. The draw parameter can be executed using many of the line drawing techniques known in the art. An example of one such technique is described by W. Newman and R. Sproull in *Principles of Interactive Computer Graphics*, McGraw-Hill, 1973.

After execution of the line draw parameters, the process next returns to decision 304 where a check for more data is made. If more data is present the subroutine is repeated, if no data is present the program is exited at 305.

If at the decision 307 an escape (0,0) is indicated, the process moves to branch 311 where again a check is made for data. If no data is present the program is exited, but if data is present the process proceeds to 315 and the next 2-bit nibble, which provides escape instructions, is read. With this 2 bit nibble, a branch instruction with four possible results is executed at decision 316. It is at this location that the escape instructions are executed. If the escape instruction is 0 and 1, then the process proceeds to 317 and the current X step size is negated, i.e., if it was positive, it is made negative and if it was negative it is made positive. If the escape instruction is 1 to 0, then the process moves to 318 and the current Y step size is negated. If the escape instruction is 1 and 1, then the process moves to 319 and the current steps in both the X and Y-directions are negated. Finally, if the escape instruction is 0 and 0, the process moves to 320 and the line drawing operation is turned off if it is currently on, or turned on if it is currently off. The process next leaves the escape instructions and returns to the decision 304 where a check is again made for data. If more data is present the primary instructions are again read and executed. If no data is present the program is exited at 305.

Figure 4:
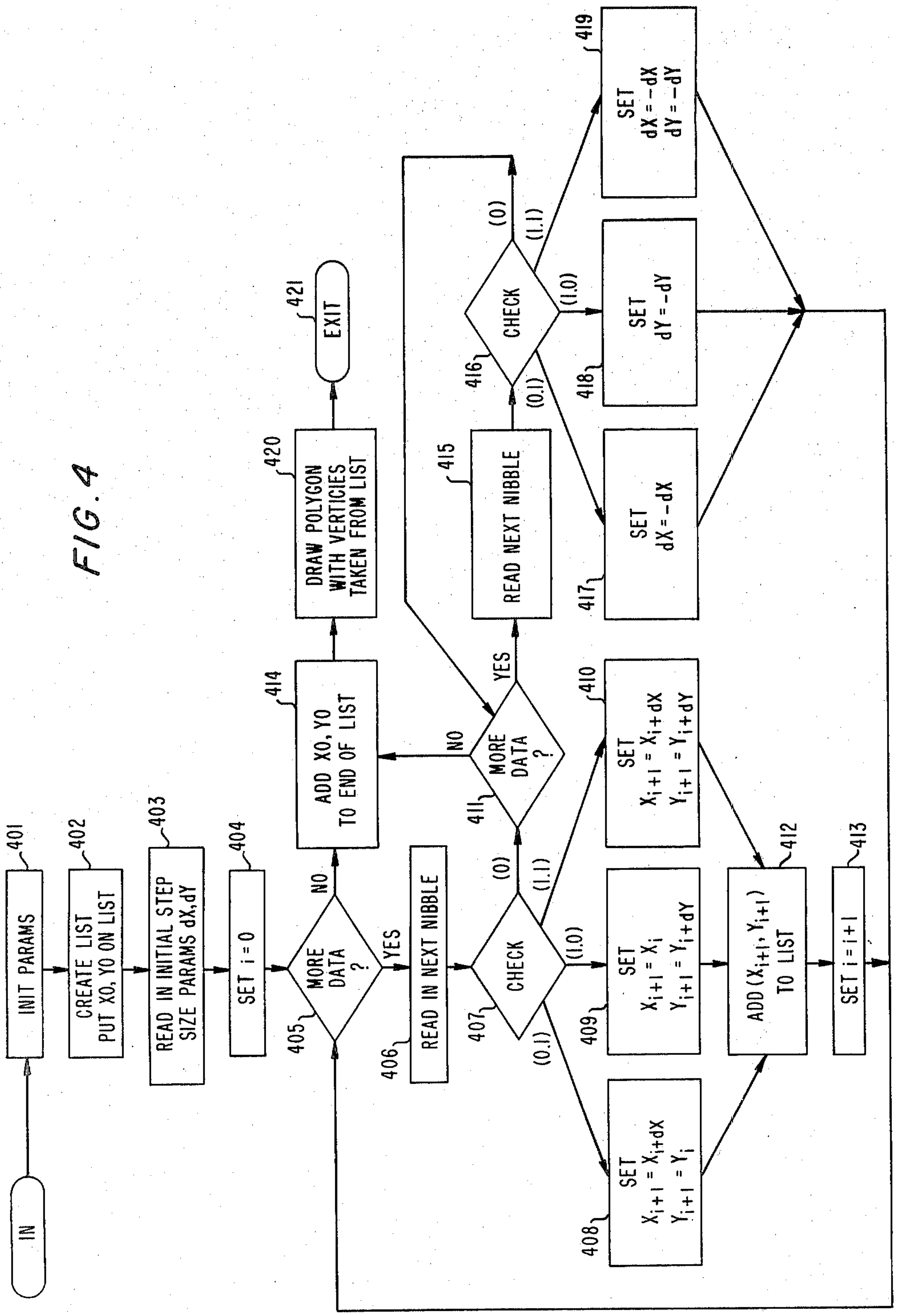
FIG. 4 depicts a flowchart disclosing a method of describing an image made up of a filled polygon in accordance with this invention.

Referring next to FIG. 4, there is shown a flowchart illustrating the operation of the video image display system in executing the incremental polygon filled operation. The incremental polygon filled flowchart is similar to the incremental line flowchart of FIG. 3 except that the drawing operation remains turned off until a list containing all the data points has been filled. Upon completion of the list a polygon is drawn that is filled with the in use color(s) and texture being used in the system.

The incremental polygon program is entered at 401 where the initializing parameters are set. In addition, the program or process includes creating a list at 402 for storing the values of X and Y. The step size is read in at 403 and the initial point is set at 404. The process advances to the decision 405 where upon seeing data advances through this sub-routine to stages 406 through 413 in the same manner as in the incremental line program and are thus not described in detail here. As earlier indicated, the one difference being the incremental lines in the polygon filled operation are not drawn until the operation is complete. Similarly, the stages 415 through 419 follow the same principles set forth with respect to practicing the present invention as similarly stages in the incremental line program and are thus not further described.

If the process is at decision 405 with no data present or at decision 411 with no data present, the process advances to 414 where the initial Y and X data points are entered again at the end of the list. The process next proceeds to subroutine 420 where the polygon is drawn with the data points taken from the list and filled with the in use color(s) and texture. Subroutine 420 is generally well known in the art and can be executed, for example, by using an ordered edge list polygon fill algorithm as described by W. Newman and R. Sproull in *Principles of Interactive Computer Graphics,* McGraw-Hill, 1973.

It is to be understood that an incremental polygon operation may be practiced within the principles of this invention by having the drawing operation always on as the data points are accessed rather than creating a list for storing the data points. In this type of arrangement, a polygon filling operation such as described by N. Weste and B. Ackland in the *SIGGRAPH* 1980 *Conference Proceedings,* Volume 14, No. 3, July 1980, pages 182–188, or as described by them in the 17*th Design Automation Conference Proceedings,* Minneapolis, Minn., June 1980, pages 285–291, is suitable. It is apparent also, that the present invention can be successfully practiced in either a hardware mode or a program mode, and that the programming may be implemented in programmable logic arrays, read only memories and the like.

Thus while the invention has been particularly shown and described with reference to specific embodiments, it will be understood that various modifications may be made without departing from the spirit and scope of this invention.

What is claimed is:

1. A video image display for assembling data received from an external data source and for displaying this data in the form of character and graphic drawings on a video display terminal, the display system comprising:

system input means for receiving the data from an external data source and for coupling the data onto a processor data bus;

a computer including a data processor and a memory portion, the data processor being coupled to the processor data bus and receiving signals from the system input means over the processor data bus, the data processor producing in response to a timing generator and the memory portion, digital image data representative of the data received from the external data source and providing this digital image data to the processor data bus in a time period determined by the timing generator; and a video image processor means connected between the video display terminal and the processor data bus and responsive to the digital image data received from the data processor, the image processor means producing an image signal defined by the digital image data for display on the video display terminal, the image comprising a series of lines being drawn sequentially from one to another of multiple points over the display area of the terminal, the size and sign of a step between points in the horizontal direction and in the vertical direction being independently specified in the data received from the external data source.

2. The video image display system of claim 1 wherein the video image processor means provides a color control signal to the video display terminal for placing a selected color and texture within the area bounded by the series of lines outlining the image.

3. The video image display system of claim 1 or 2 wherein the video image processor means provides a separate direction change command signal for both the horizontal direction and for the vertical direction, the direction change command signal modifying the direction of the series of lines being drawn on the video display terminal and providing for the reflection of the image.

4. The video image display system of claim 3 wherein the direction change command signal further provides for turning on and off the drawing of the image allowing for gaps to occur between the lines being drawn.

5. The video image display system of claim 4 wherein the direction change command signal comprises a two-bit nibble.

6. A method of assembling data received from an external data source and for displaying this data in the form of character and graphic drawings on a video display terminal in a video image display system, the method comprising the steps of:

receiving the data from the external data source, coupling the data received from the external data source to a computer having a data processor and a memory portion, the data processor producing in response to a timing generator and the memory portion, digital image data representative of the data received from the external data source, the video image processor being coupled both to the computer and the video display terminal and responsive to the digital image data received from the data processor, the image processor producing an image signal defined by the digital image data for display on the video display terminal;

writing the image onto a specific location of the video display terminal, the image comprising a series of lines being drawn sequentially from one to another of multiple points over the display area of the terminal, the size and sign of a step between points in the horizontal direction and in the vertical direction being independently specified in the data received from the external data source.

7. A method of assembling data in accordance with claim 6 and further comprising the step of inserting a selected color and texture within the area bonded by the series of lines outlining the image.

8. A method of assembling data in accordance with claims 6 or 7 and further comprising the step of providing a separate direction change command signal for both the horizontal direction and for the vertical direction in addition to the image signal in the video image processor, the direction change command signal modifying the direction of the series of lines being drawn on the video display terminal and providing for the reflection of the image.

9. A method of assembling data in accordance with claim 8 wherein the step of providing the direction change command signal also includes turning on and off the writing of the image allowing for gaps to occur between the lines being drawn.

10. A method of assembling data in accordance with claim 9 wherein the direction change command signal comprises a two-bit nibble.

* * * * *